April 22, 1947.　　　K. A. BEIER　　　2,419,385
FLEXIBLE SEAL
Filed July 28, 1944
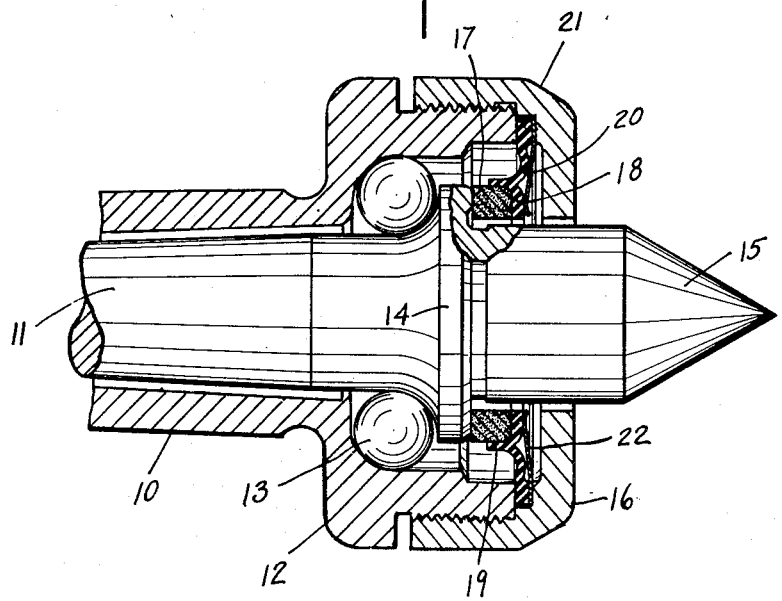
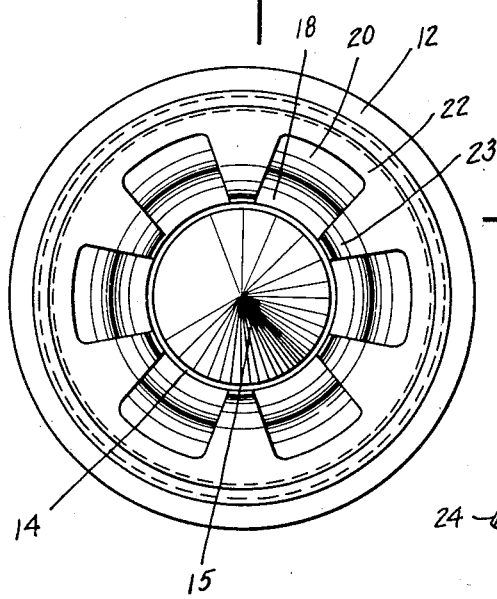
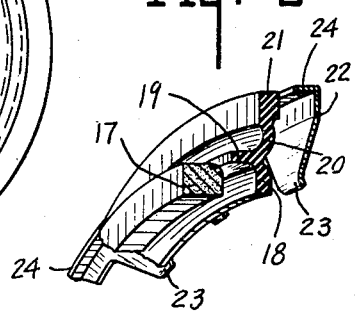
INVENTOR.
KURT A. BEIER.
BY
Lockwood, Goldsmith & Galt
ATTORNEYS.

Patented Apr. 22, 1947

2,419,385

UNITED STATES PATENT OFFICE 2,419,385

FLEXIBLE SEAL

Kurt A. Beier, Indianapolis, Ind., assignor to Schwitzer-Cummins Company, Indianapolis, Ind., a corporation Application July 28, 1944, Serial No. 546,991

5 Claims. (Cl. 286—11)

This invention relates to an improvement in flexible fluid sealing devices and is particularly adapted for use in connection with centering tools for protecting the lubricant and bearing parts from gritty substances, destructive soluble oils or coolants. The seal is further applicable for use in connection with water pumps or any device having a shaft extending into a fluid chamber whereby it is desired to retain or protect the fluid within the chamber and eliminate or minimize leakage of fluid therefrom or penetration of detrimental matter therein.

The invention resides in the provision of a fluid seal employing a flexible sealing disk formed to embrace in sealing engagement a rigid seal and bearing ring, the flexible sealing disk being supported and centered within a metallic support provided with resilient fingers formed and arranged to maintain the disk and ring in sealing contact with each other, and the ring in sealing engagement with the relatively rotatable bearing surface.

Another feature of the invention resides in the form, arrangement and association of the several parts going to form the seal, such that it will comprise a self-contained sealing unit readily mountable within the structure to be sealed or removed therefrom as a unit.

Other features of the invention will be more specifically set forth and described in the following specifications and drawings attached.

The full nature of the invention will be understood from the following description and claims and the accompanying drawings:

Fig. 1 is a central vertical section through the bearing of a tool structure and the flexible seal mounted therein with the spindle in elevation.

Fig. 2 is an end elevation of the tool structure with the closure cap removed.

Fig. 3 is a perspective view of the seal assembly with parts broken away.

In the drawings there is shown by way of illustration of one embodiment of the flexible seal structure a tool comprising a shank 10 forming a sealed lubricant centering housing rotatable relative to a spindle 11 extending freely therein. The shank 10 of the housing is enlarged at one end to provide an open cupped portion 12 and formed to receive and provide a ball race support for the ball bearing 13, which supports the spindle for relative rotation adjacent an outwardly extending flange 14 formed thereon.

Forwardly of the flanged bearing portion of the spindle there extends a centering head 15. The open cupped end 12 is closed by a removably mounted closure cap 16 screw threaded thereon. Said cap is centrally apertured to permit the head 15 to freely extend therefrom.

In a structure of this character it is desirable that spring pressure be exerted against the thrust bearing flange of the spindle to retain it under spring pressure against the ball bearings, and at the same time maintain an effective seal against escape of lubricant and admission of gritty substances, coolants or the like. Thus, such a tool structure may be caused to operate smoothly and without overheating under heavy load and at high speed without loss or destruction of the lubricant.

The seal comprises a rigid sealing ring 17 of carbon or the like, supported and centered within a flexible annular cup portion 18, preferably formed of rubber or a rubber composition. The carbon ring is surrounded by an inwardly extending rim 19 defining the cup portion of the seal. Extending laterally and outwardly from the cup portion 18 there is an outer flexible diaphragm portion which is S-shaped in cross section, as indicated at 20, and provided about its outer periphery with a bead 21. Lying over the front face of the cupped and diaphragm portions of the seal, there is an annular spring 22 having its outer portion bearing against the bead 21 and its inner portion formed with radially and inwardly extending spaced fingers 23 for exerting spring pressure against the cup portion 18. The outer periphery of the spring is provided with an embracing and supporting flange 24 for receiving the bead 21 which is nested therein.

In assembly, the sealing ring 17 is carried within the cup portion 18 of the rubber sealing diaphragm 20, and this cup portion of the rubber seal may be vulcanized to the carbon sealing ring. Under pressure of the spring fingers 23 the carbon sealing ring is held in sealing engagement against the thrust bearing surface of the flange 14 of the spindle. By means of the rim 19 on the cup portion 18, the sealing ring is flexibly suspended in fixed relation to the spindle so that relative motion may occur between the thrust bearing of the spindle and the sealing ring. The spring 22 is mounted and supported over and about the bead 21 which nests within its peripheral flange 24. Thus, the seal is unitary in that the sealing ring 17 is supported by the cup portion 18 within its outer diaphragm 20 which in turn is supported and retained within the supporting flange 24 of the spring 22.

The closure cap 16 is provided with a recessed portion and shoulder formed to snugly embrace and clamp the peripheral bead 21 of the diaphragm 20 against the forward face of the housing. Thus, through the bead 21 the closure cap effects a seal against the forward face of the housing in conjunction with the rotative sealing contact between the sealing ring 17 and the thrust bearing face of the spindle flange 14. This results in a unitary seal structure of sufficient flexibility to permit longitudinal and out of line movement of the spindle relative to the housing, and of the required tension to retain the spindle upon its bearing while protecting the interior of the housing against loss of lubricant or admission of damaging foreign matter.

Whereas the seal has been illustrated and described as applied to a center tool structure, it is similarly applicable to any structure embodying a housing and spindle or shaft having relative rotation, to provide a liquid seal between such relative rotatable parts.

The invention claimed is:

1. A fluid seal comprising a circular flexible sealing disk having an inner cup-like portion about its inner periphery, a rigid sealing ring seated and embraced about its outer periphery to be thereby retained within said cup-like portion in sealing engagement therewith, said disk having a diaphragm formed about the cup-like portion, and a spring disk within which said sealing disk is supported and centered, said spring disk extending into engagement with the cup-like portion of said flexible disk in opposition to said sealing ring for exerting spring tension thereagainst.

2. A fluid seal comprising a circular flexible sealing disk having an annular rim intermediate its inner and outer peripheries defining an inner cup-like portion, a rigid sealing ring seated and embraced within said rim to be retained thereby in sealing engagement with said cup-like portion, said disk having a diaphragm extending outwardly from the rim of the cup-like portion, and a spring disk supported over and about said diaphragm and bead having inwardly and radially extending fingers engageable with the cup-like portion of said flexible disk in opposition to said sealing ring for exerting spring tension thereagainst.

3. A fluid seal comprising a circular flexible sealing disk having an annular rim intermediate its inner and outer peripheries to define an inner cup-like portion, a rigid sealing ring seated and embraced within said rim to be retained thereby for sealing engagement with the cup-like portion of said disk, said disk having a diaphragm extending radially outward from said rim and cup-like portion, and a spring lying over said diaphragm engageable under spring tension with said cup-like portion in opposition to said sealing ring for exerting spring tension thereagainst.

4. A fluid seal structure including a housing provided with an open cupped end, a spindle supported in said housing for relative rotation therebetween and extending through the open end thereof, said spindle being provided with a flange having a thrust bearing sealing surface, a sealing ring having sealing contact with said surface, a flexible sealing disk having an inner annular cup-like portion embracing and supporting said ring and an outer diaphragm extending into sealing engagement with the cupped end of said housing, a spring disk flanged about its periphery to embrace said diaphragm and extend into engagement with said cup-like portion in opposition to said ring, and a cap removably mounted over the open end of said housing to compress said sealing disk into sealing engagement therewith and force said spring disk under spring tension against said cup-like portion and sealing ring.

5. A fluid seal structure including a housing provided with an open end, a spindle supported in said housing for relative rotation therebetween and extending through the open end thereof, said spindle being provided with a flange having a thrust bearing sealing surface, a sealing ring having sealing contact with said surface, a flexible sealing disk having an inner annular cup-like portion embracing and supporting said ring and outer diaphragm S-shaped in cross section extending into sealing engagement with the end of said housing, a spring disk flanged about its periphery to embrace said diaphragm and provided with inwardly and radially extending spring fingers having engagement with said cup-like portion in opposition to said ring, and a cap removably mounted over the open end of said housing to compress said disks into sealing engagement therewith and force the fingers of said spring disk against said cup-like portion and sealing ring for maintaining said sealing ring in sealing contact with the thrust bearing surface of the spindle under spring tension.

KURT A. BEIER.

REFERENCES CITED

The following references are of record in the file of this patent:

UNITED STATES PATENTS

| Number | Name | Date |
| --- | --- | --- |
| 2,308,114 | Schjolin | Jan. 12, 1943 |
| 2,000,341 | Larsh | May 7, 1935 |
| 2,342,955 | Meyer | Feb. 29, 1944 |